United States Patent [19]

Ochiai et al.

[11] Patent Number: 5,216,929
[45] Date of Patent: Jun. 8, 1993

[54] SMALL-SIZED MOTOR WITH WORM REDUCTION GEAR

[75] Inventors: Takao Ochiai, Ashikaga; Yuji Hagiwara, Kiryu, both of Japan

[73] Assignee: Mitsuba Electric Manufacturing Co., Ltd., Gunma, Japan

[21] Appl. No.: 887,707

[22] Filed: May 22, 1992

[30] Foreign Application Priority Data

Jun. 4, 1991 [JP] Japan ............... 3-05027[U]

[51] Int. Cl.$^5$ ................................. F16H 1/16
[52] U.S. Cl. ............................ 74/425; 74/89.14
[58] Field of Search .................. 74/89.14, 425; 192/0.02 R

[56] References Cited

U.S. PATENT DOCUMENTS

| Re. 26,356 | 3/1968 | Pickles | 74/425 X |
|---|---|---|---|
| 1,898,945 | 2/1933 | Fitzgerald | 74/425 X |
| 2,868,031 | 1/1959 | Schumb | 74/425 |
| 4,605,107 | 8/1986 | Hallidy et al. | 192/2 R |
| 4,742,726 | 5/1988 | Adam et al. | 74/425 |
| 4,805,472 | 2/1989 | Aoki et al. | 74/89.14 X |
| 4,987,791 | 1/1991 | Nakahashi et al. | 74/425 |

FOREIGN PATENT DOCUMENTS 1-133545  9/1989  Japan.

*Primary Examiner*—Allan D. Herrmann
*Assistant Examiner*—David W. Laub

[57] ABSTRACT

In a small-sized motor with a worm reduction gear wherein a worm, an armature and the like are coupled onto the outer periphery of an intermediate portion of a motor shaft and fixed thereto; the motor shaft is inserted into a gear case, whereby a worm wheel is meshed with the worm; a journal member having the outer diameter larger than that of the worm is projectingly provided at a position close to the worm of the motor shaft; a bearing in the intermediate portion is fixed to the gear case; and the journal member is supported by this bearing in the intermediate portion.

5 Claims, 4 Drawing Sheets

SMALL-SIZED MOTOR WITH WORM REDUCTION GEAR

BACKGROUND OF THE INVENTION

1. Field of the Invention

This invention relates to a small-sized motor provided with a worm reduction gear, and more particularly to a small-sized motor wherein a worm is press-fitted onto a motor shaft and a turning force of the motor is transmitted to a load through a worm wheel being in meshing engagement with this worm, for example, one effectively used in a power window motor for a motor vehicle.

2. Related Art Statement

As a power window motor for a motor vehicle, conventionally there has been used such a small-sized motor provided with a worm reduction gear that an output from the motor is reduced in speed through a worm reduction gear; a motor shaft thereof is lengthened; and a worm is press-fitted onto the intermediate portion of the lengthened motor shaft.

As a small-sized motor of this type, for example, there is one disclosed in Japanese Utility Model Laid-Open No. 1-133545, which is constructed as shown in FIG. 3.

That is, this small-sized motor with the worm reduction gear is provided with a motor section and a reduction gear section, which are connected in series with each other, wherein a motor shaft 1 is racked over the whole length of the motor section and the reduction gear section, being rotatably supported by a bearing 2 on the motor section's side, a bearing 3 on the reduction gear section's side and a bearing 4 in the intermediate portion. A worm 5, an armature and a commutator are press-fitted onto the motor shaft 1 and fixed thereto. The worm 5 is in meshing engagement with a worm wheel 6 in the reduction gear section, whereby a reduced turning force of the motor shaft 1 is transmitted to an output shaft 7 fixed to the worm wheel 6.

The bearing 4 in the intermediate portion is constructed to be supported in a motor case by a bearing holder 8 formed separately from the motor case and a gear case and be centered through the bearing holder 8. This bearing holder 8 additionally functions as a brush holder stay. Furthermore, to improve the workability in assembling the worm 5 onto the motor shaft 1, the bearing 4 in the intermediate portion is spaced at a satisfactory distance L from the worm 5.

However, the small-sized motor with the worm reduction gear having the above-described arrangement presents the following problems.

(1) The bearing 4 in the intermediate portion is supported by the motor case through the bearing holder 8 formed separately from the motor case and the gear case, so that the number of parts and the number of assembling processes are increased.

(2) Moreover, to maintain the precise coaxial relations between the bearings 2, 3 and 4 disposed at three positions for supporting the motor shaft 1, it is necessary to strictly control the working accuracy and the assembling accuracy of the bearing holder 8, motor case, gear case and the like.

(3) If the coaxial preciseness of the bearings at the three positions for supporting the motor shaft 1 are low, then the meshing accuracy between the worm 5 and the worm wheel 6 is decreased, whereby, in the motor such as the motor for a power window used under a heavy load, there is a risk that the worm wheel 6 made of a resin material may be broken.

(4) The bearing 4 in the intermediate portion is spaced far from the worm 5, whereby the motor shaft 1 is easily flexed, so that the meshing accuracy between the worm 5 and the worm wheel 6 may be decreased.

(5) During the work of press-fitting the worm 5 onto the motor shaft 1, first, the bearing holder 8 is coupled onto the motor shaft 1 in a hanging state, whereby a jig for holding this bearing holder 8 is required, so that not only the work becomes complicated but also it becomes difficult to manufacture a small-sized motor of high quality.

SUMMARY OF THE INVENTION

An object of the present invention is to provide a small-sized motor with a worm reduction gear, which is capable of improving the coaxial preciseness of the bearings at the three positions and simplifying the assembling work.

According to the present invention, a small-sized motor with a worm reduction gear, wherein a worm, an armature and a commutator are coupled onto a motor shaft and fixed thereto; an end portion of the motor shaft is inserted into a gear case and the worm is meshed with a worm wheel rotatably supported by the gear case; and further, the motor shaft is rotatably supported by bearings at the both ends thereof and a bearing in an intermediate portion, is characterized in that a journal having an outer diameter larger than that of the worm is projectingly provided at a position close to the worm of the motor shaft; while, the aforesaid bearing in the intermediate portion is provided on the gear case; and the aforesaid journal is rotatably supported by this bearing in the intermediate portion.

In the above-described small-sized motor with the worm reduction gear according to the present invention, the journal having the outer diameter larger than that of the worm is supported by the bearing in the intermediate portion fixed to the gear case at the position close to the worm of the motor shaft, whereby the motor shaft is brought into the state of being supported at a position in the vicinity of the worm, so that the flexing of the motor shaft becomes small and the coaxial preciseness of the bearings at the three positions are improved.

Furthermore, the bearing in the intermediate portion is fixed to the gear case, so that no bearing holder for holding the bearing in the intermediate portion should be needed. Accordingly, during the work of press-fitted the worm onto the motor shaft, the jig for holding the bearing holder and the like can not be needed, so that the work of press-fitting the worm onto the motor shaft can be simplified.

BRIEF DESCRIPTION OF THE DRAWINGS

The above and other objects and features of the present invention will become more apparent when referred to the following descriptions given in conjunction with the accompanying drawings, wherein like reference numerals denote like elements, and in which.

DETAILED DESCRIPTION OF THE PREFERRED EMBODIMENT

Figure 1:
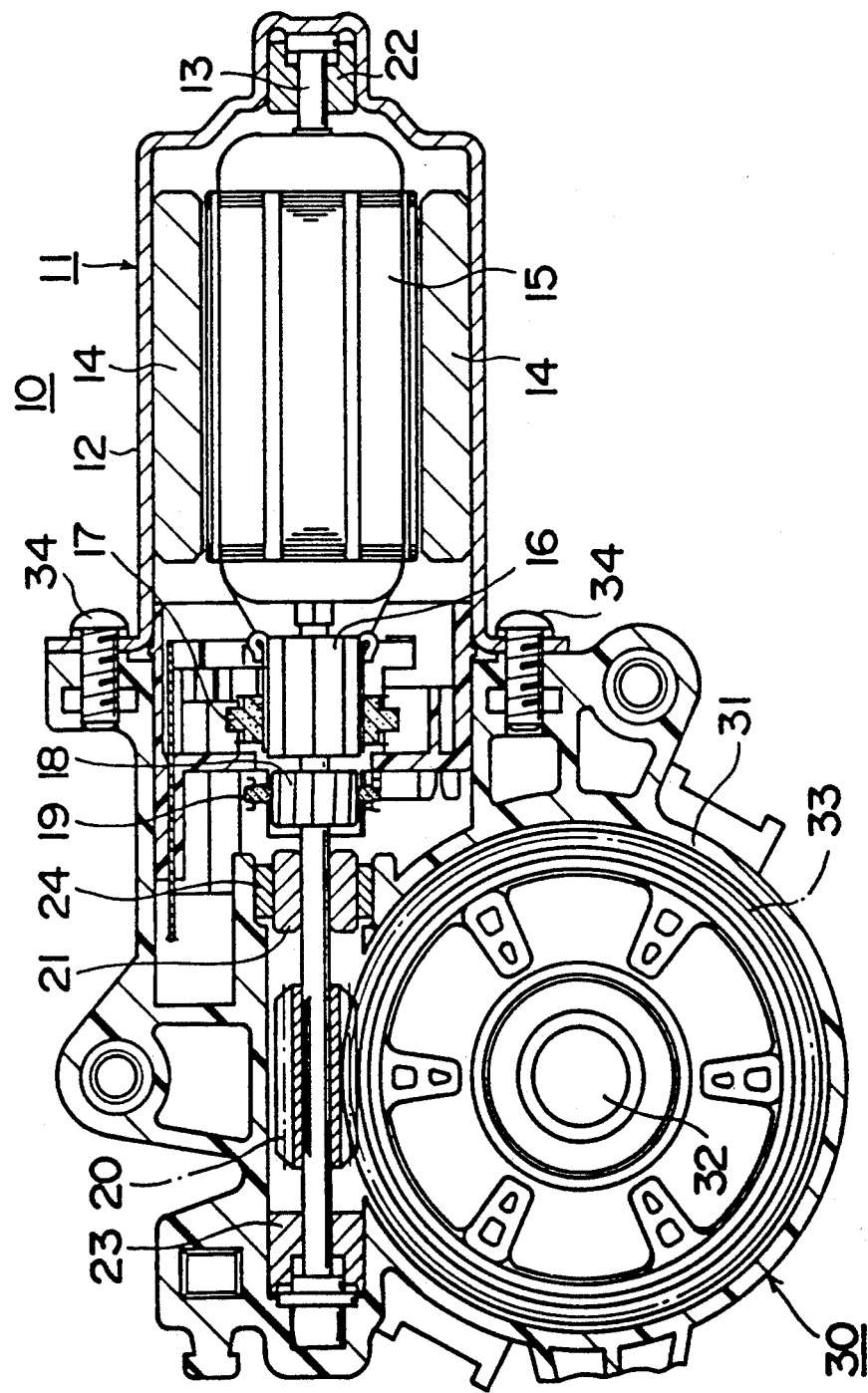
FIG. 1 is a longitudinal sectional view showing an embodiment of the small-sized motor with the worm reduction gear according to the present invention.
Figure 2:
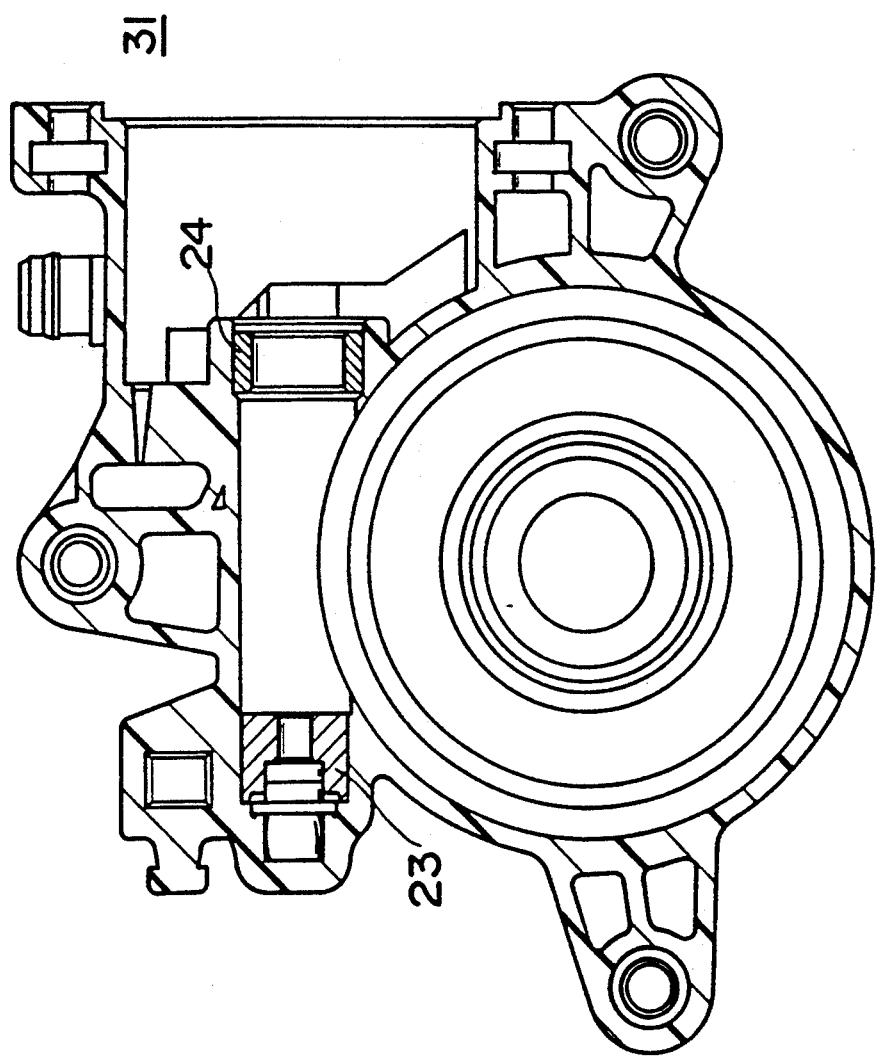
FIG. 2 is a longitudinal sectional view showing the gear case thereof.
Figure 3:
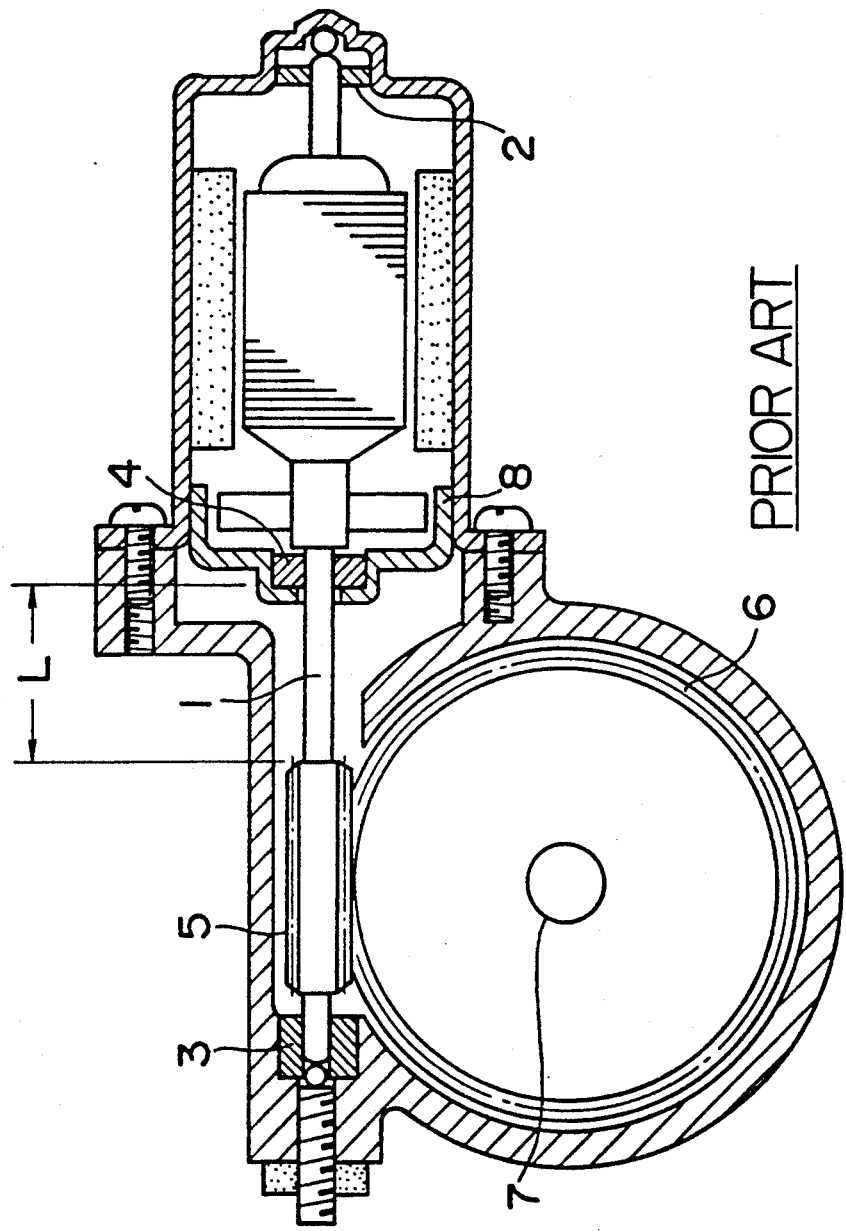
FIG. 3 is a frontal sectional view showing the conventional small-sized motor with the worm reduction gear.

Referring to the drawings, FIGS. 1 and 2 show an embodiment of the small-sized motor with a worm reduction gear according to the present invention, which is constructed so as to be suitable for a motor for a power window of a motor vehicle. This small-sized motor 10 with the worm reduction gear comprises a motor section 11 and a reduction gear section 30. A motor case 12 of the motor section 11 and a gear case 31 of the reduction gear section are arranged serially with each other, and fastened through screws 34 to each other to be integrally connected. A motor shaft 13 formed in an elongated round rod having a relatively small diameter is racked in the motor case 12 and the gear case 31 over the whole length thereof, and both end portions and an intermediate portion of this motor shaft 13 are rotatably supported by a bearing 22 on the motor section's side, a bearing 23 on the reduction gear's side and a bearing 24 in the intermediate portion respectively.

An armature 15 is fixed to the motor shaft 13 in a manner to be coupled onto the motor shaft 13 in the motor section 11 and to be rotatable integrally therewith. A plurality of magnets 14 as being field poles are solidly secured to the inner peripheral surface of the motor case 12 opposed to the armature 15, being arranged at intervals in the circumferential direction. Furthermore, a commutator 16 in slidable contact with brushes 17 is coupled onto the motor shaft 13 and fixed thereto in the proximity of the armature 15, and further, a detected element 18 in slidable contact with a detecting element 19 of a rotary detector is coupled onto the motor shaft 13 and fixed thereto in the vicinity of the commutator 16.

In this embodiment, the worm 20 is formed separately from the motor shaft 13 by a suitable means such as a thread rolling machine, and is relatively press-fitted onto the outer periphery of the intermediate portion of the motor shaft 13 and fixed thereto. A journal member 21 as being the journal formed to have the larger outer diameter than that of the worm 20 is relatively press-fitted and fixed between the worm 20 fixed to the outer periphery of the intermediate portion of the motor shaft 13 and the detected element 18 of the rotary detector. This journal member 21 is formed to provide a cylindrical form having a large wall thickness, and the outer diameter thereof is formed to be slightly larger than that of the worm 20.

On the other hand, the gear case 31 of the reduction gear section 30 is integrally formed of resin, and an output shaft 32 is rotatably supported while being inserted in a direction perpendicular to the motor shaft 13 at the substantially central portion in the gear case 31. A worm wheel 33 is fixed to this output shaft 32 to be rotatable integrally therewith, and this worm wheel 33 is meshed with the worm 20 in the gear case 31. For the purpose of reducing the noises and so forth, the worm wheel 33 is integrally formed of resin.

In this embodiment, the bearing 24 in the intermediate portion for rotatably supporting the intermediate portion of the motor shaft 13 is provided and press-fitted to gear case 31 formed of resin at a position facing to an opening surface opposed to the motor case 12 and a position through which the motor shaft 13 is inserted. The journal member 21 fixedly coupled onto the motor shaft 13 is rotatably coupled into this bearing 24 in the intermediate portion and supported thereby. To rotatably support the journal member 21, the inner diameter of this bearing 24 in the intermediate portion is determined to be slightly larger than the outer diameter of the journal member 21, and this means that the inner diameter of this bearing 24 in the intermediate portion is formed to be larger than the outer diameter of the worm 20.

The assembling work of the small-sized motor with the worm reduction gear having the above-described arrangement will hereunder be described.

The armature 15, the commutator 16, the detected element 18 of the rotary detector and the journal member 21 are fixedly coupled onto the motor shaft 13 at respective predetermined positions in the intermediate portion of the motor shaft 13. Furthermore, the worm 20 is relatively press-fitted onto the motor shaft 13, coupled and fixed at a predetermined position in the intermediate portion of the motor shaft 13.

On the other hand, as shown in FIG. 2, the bearing 23 on the reduction gear section's side and the bearing 24 in the intermediate portion are respectively press-fitted and fixed onto the gear case 31 formed of resin. Furthermore, the worm wheel 33 is housed in the gear case 31, and the output shaft 32 is inserted through the gear case 31 and connected to the worm wheel 33.

Then, the end portion of the motor shaft 13, on which side the worm 20 is fixedly coupled, is inserted into the gear case 31 through the opening opposed to the motor case 12. Along with this insertion, a forward end portion on the inserted side of the motor shaft 13 is coupled into the bearing 23 on the reduction gear section's side provided in the inner side of the gear case 31; the worm 20 is meshed with the worm wheel 33; and further, the journal member 21 is coupled into the bearing 24 in the intermediate portion provided on the inlet side of the gear case 31.

At this time, the worm 20 can easily pass the bearing 24 in the intermediate portion without interference because the inner diameter of the bearing 24 in the intermediate portion is formed to be larger than the outer diameter of the worm 20. Furthermore, the outer diameter of the journal member 21 is determined to be rotatably coupled into the bearing 24 in the intermediate portion, whereby the journal member 21 is brought into a state of being rotatably supported by the bearing 24 in the intermediate portion.

Thereafter, the motor case 12 is caused to cover the outer surface of the armature 15 of the motor shaft 13. In other words, the motor shaft 13 is inserted into the motor case 12. Along with this insertion, the end portion of the motor shaft 13 on the motor case's side is rotatably coupled into the bearing 22 on the motor section's side and brought into a state of being rotatably supported.

The following advantages can be attained by the above embodiment.

(1) The journal member 21 having the diameter larger than that of the worm 20 in the intermediate portion is fixedly coupled onto the intermediate portion of the motor shaft 13, and this journal member 21 is rotatably coupled into the bearing 24 in the intermediate portion which is press-fitted onto the gear case 31 and supported thereby, so that the bearing 24 in the intermediate portion is brought into a state of supporting the motor shaft 13 at a position close to the worm 20. As a result, the coaxial preciseness of the bearings at the three positions supporting the motor shaft 13 can be improved, and also the flexing of the motor shaft 13 can be controlled.

(2) The turning accuracy of the motor shaft 13, the meshing accuracy between the worm 20 and the worm wheel 33, and the like can be improved owing to the above-described (1), so that the occurring of damages of the worm wheel 33 can be prevented in advance, and the quality and reliability of the small-sized motor with the worm reduction gear can be enhanced.

(3) The inner diameter of the bearing 24 in the intermediate portion is formed to be larger than the outer diameter of the worm 20, so that during the work of inserting the worm 20 of the motor shaft 13 into the gear case 31, the worm 20 can pass through the bearing 24 in the intermediate portion without interference.

(4) The bearing 24 in the intermediate portion is press-fitted onto the gear case 31 and fixed thereto, so that the conventional bearing holder can be dispensed with. As a result, the number of the parts and the number of assembling processes can be decreased, and also the decrease of coaxial preciseness between the motor shaft 13 and the bearings at three positions due to the combined effect of the working tolerance, errors in assembling and the like of the components can be prevented.

(5) The assembling works can be simplified and the productivity can be enhanced owing to the above-described (3) and (4), so that the manufacturing costs of the small-sized motor with the worm reduction gear can be reduced greatly.

Incidentally, the present invention is not limited to the above embodiment and can be varied in various ways within the scope of the invention.

Figure 4:
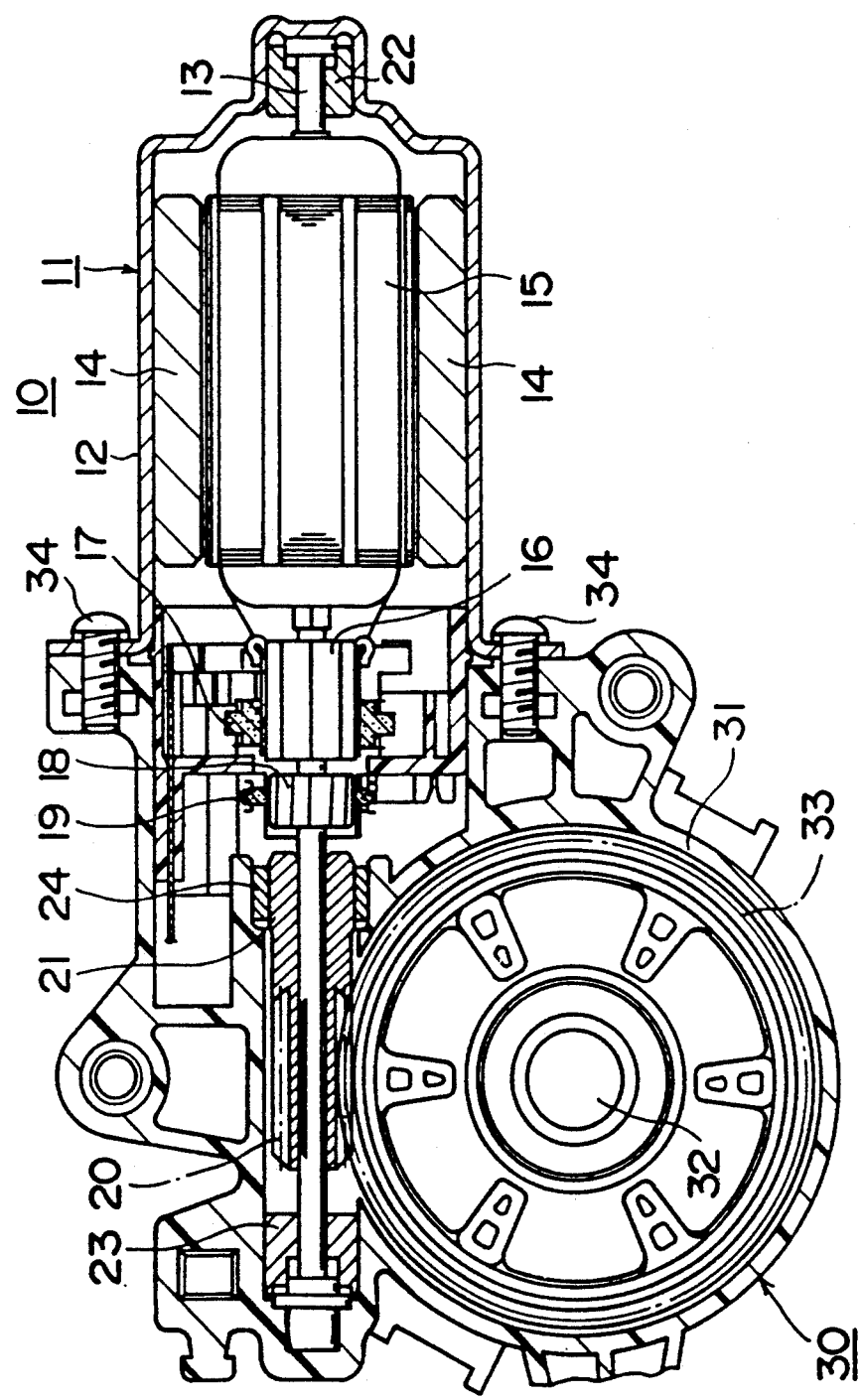
FIG. 4 is a longitudinal sectional view showing a small-sized motor with worm reduction gear comprising another embodiment of the invention.

For example, the worm 20 and the journal member 21 should not be limited to the constructions in which they are formed separately from and press-fitted onto the motor shaft 1, and may be constructed, as shown in FIG. 4, such that the journal member 21 is integrally formed on an end of the worm 21 and the resultant part may be press-fitted onto the motor shaft 13.

Furthermore, the diameter of a portion of the motor shaft 13 supported by the bearing 24 in the intermediate portion may be larger than the diameter of other portions of the motor shaft 13.

As has been described hereinabove, according to the present invention, the coaxial preciseness of the bearings at three positions can be improved and the assembling works can be simplified, so that the small-sized motor with the worm reduction gear being high in the quality and reliability can be manufactured at low costs.

What is claimed is:

1. A small sized motor with a worm reduction gear, wherein a worm, an armature and a commutator are coupled onto a motor shaft and fixed thereto; an end portion of the motor shaft is inserted into a gear case, whereby the worm is meshed with a worm wheel rotatably supported on said gear case; and further, the motor shaft is rotatably supported by bearings at the both ends thereof and a bearing in the intermediate portion, characterized in that a journal having an outer diameter larger than that of the worm is projectingly provided at a position close to the worm of the motor shaft; said bearing in the intermediate portion is provided on the gear case; said journal is rotatably supported by said bearing in the intermediate portion; and said armature, said commutator, a detected element of a rotary detector, said journal and said worm are respectively press-fitted onto said motor shaft and fixed thereto in the described order.

2. The small-sized motor as set forth in claim 1, wherein said journal is formed to provide a cylindrical form having a large wall thickness.

3. The small-sized motor as set forth in claim 1, wherein the outer diameter of said worm is smaller than the inner diameter of said bearing in the intermediate portion.

4. The small-sized motor as set forth in claim 1, wherein the diameter of a portion of said motor shaft supported by said bearing in the intermediate portion is larger than the diameter of other portions of said motor shaft.

5. The small-sized motor as set forth in claim 1, wherein said journal is integrally formed on an end of said worm.

* * * * *